(No Model.) 2 Sheets—Sheet 1.

H. NEHRMEYER.
STALK CUTTER.

No. 516,444. Patented Mar. 13, 1894.

WITNESSES:
Fred G. Dieterich
M. D. Blondel

INVENTOR
Henry Nehrmeyer.
BY
ATTORNEYS.

(No Model.) 2 Sheets—Sheet 2.
H. NEHRMEYER.
STALK CUTTER.
No. 516,444. Patented Mar. 13, 1894.
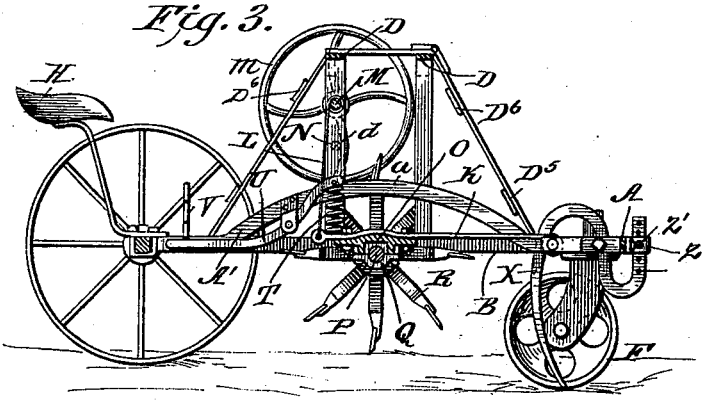
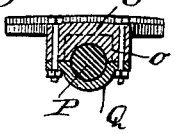
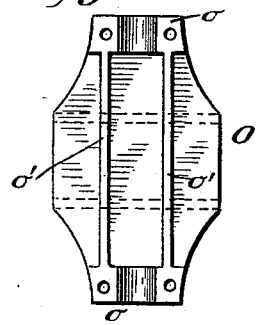
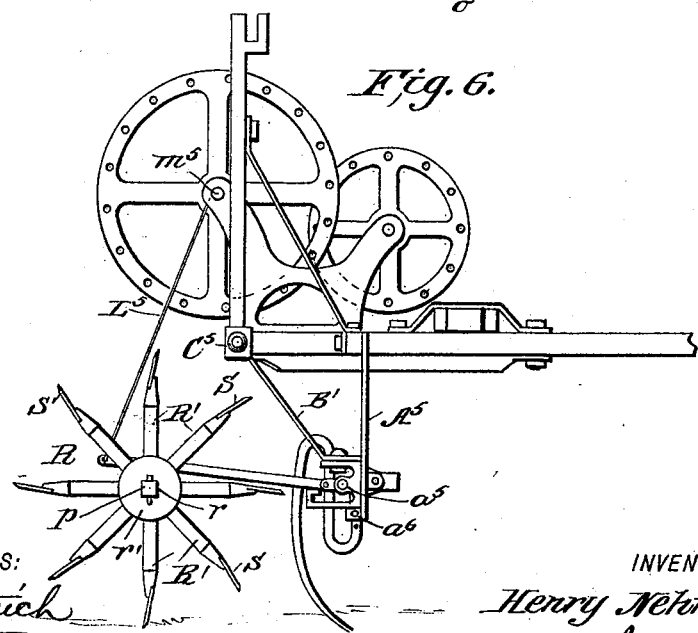
WITNESSES:
Fred G. Dieterich
M. D. Blondel
INVENTOR
Henry Nehrmeyer
BY Munn & Co
ATTORNEYS.

UNITED STATES PATENT OFFICE.

HENRY NEHRMEYER, OF REINHARDT, TEXAS.

STALK-CUTTER.

SPECIFICATION forming part of Letters Patent No. 516,444, dated March 13, 1894.

Application filed June 16, 1893. Serial No. 477,861. (No model.)

*To all whom it may concern:*

Be it known that I, HENRY NEHRMEYER, residing at Reinhardt and State of Texas, have invented a new and Improved Stalk-Cutter, of which the following is a specification.

My invention has for its object to provide a stalk cutting machine which is more especially adapted to cut four rows of stalks at one operation, in an effective and economical manner.

It has also for its object to provide a machine of this character in which the main frame and the cutting attachments are of a simple and inexpensive nature, in which the several cutter devices are adapted for independent vertical adjustment and which can be elevated together, such parts being so arranged relatively as to require the assistance of but one operator, who adjusts the same from the driver's seat.

With other minor objects in view, all of which will hereinafter be referred to, the invention consists in the sundry combination and novel arrangement of parts, all of which will be first described, and then particularly pointed out in the claims, reference being had to the accompanying drawings in which—

Figure 1:
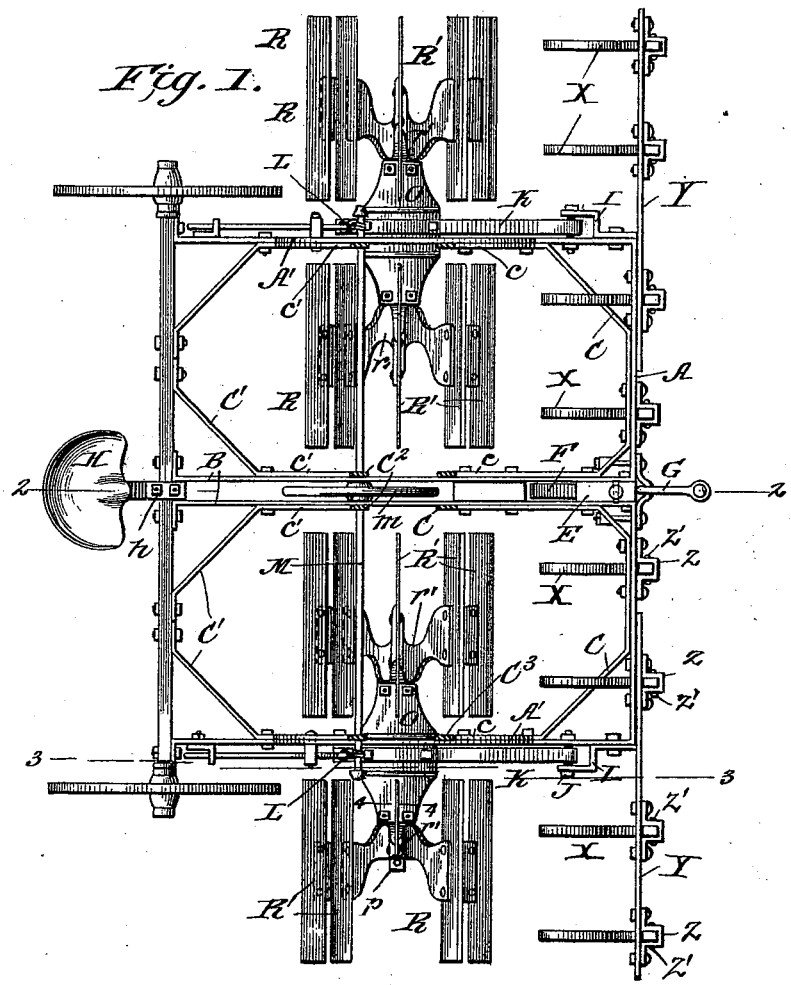
Figure 2:
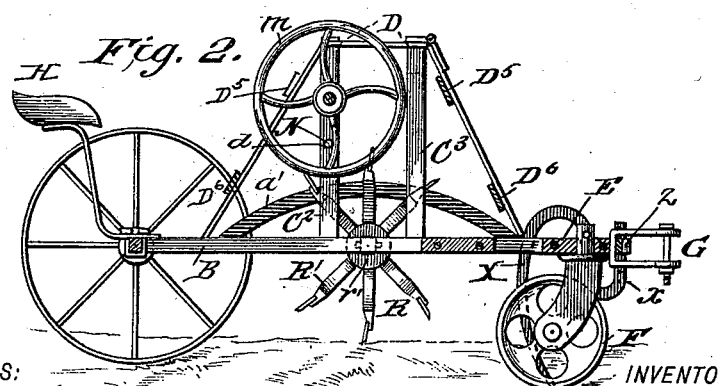

Figure 1 is a plan view of my improved stalk cutting machine. Fig. 2 is a vertical longitudinal section of the same on the line 2—2 Fig. 1. Fig. 3 is a similar view on the line 3—3 Fig. 1. Fig. 4 is a detail transverse section on the line 4—4 Fig. 1. Fig. 5 is an inverted plan view of one of the rotary cutter shaft bearings, and Fig. 6 is a sectional elevation of a modified arrangement of the main supporting frame.

In the practical construction of my improved stalk cutting machine I employ a main frame constructed of a rectangular body comprising the front cross bar A, and the side arms A', which are secured at their rear ends to the axle, and are curved upward as at $a'$ for a purpose hereinafter explained. Centrally of the main frame is disposed a pair of parallel bars B, which are secured at their rear ends to the axle and at their front ends to the cross bar A.

C C' indicate brace bars which are bolted respectively to the bars B, A, and the axle, and the bars A A' and the axle as most clearly shown in Fig. 1, the inner ends $c\ c'$ of which terminate in vertical standards $c^2\ c^3$, which are connected by cross bars D. Between the front ends of the bar B is secured a block E in which is journaled the shank of a caster wheel F, and to the bar A in front of the block E is secured the clevis clip G.

H indicates the seat secured to a clip $h$, in turn secured to the axle as shown.

On the bars A' at their front ends are bolted clip or bracket members I to which and the said bars are secured bolts J, to which are pivotally connected supporting bars K the rear ends of which have a flexible connection L with a transverse shaft M, journaled in the rear standards $C^2$, which shaft has fixedly held thereon, a hand wheel $m$ whereby it can be rotated to wind up the connections L and lift the cutters and their supporting frame, for a purpose hereinafter described, a key bolt N being provided, which is adapted to be inserted through an aperture $d$ in the standard and between the spokes of the wheel $m$ to hold same from reverse motion when desired.

O indicates castings bolted to the under face of the bars K, which project laterally, and have at their ends on its under face half bearing boxes $o\ o$, and strengthening ribs $o'\ o'$. It will be noticed by reference to Fig. 1 that the castings O extend to each side of the bars K, and on the under face of each of such castings O is mounted a shaft P it being held in place by the cap bearing boxes Q as shown. These shafts P extend at their ends as at $p$, which ends are non-circular to enter the sockets $r$ in the hubs $r'$ of the cutters R. These cutters consist of a series of arms R' radiating from the hub $r'$, to which are bolted at their outer ends, extended cutter blades S, which are arranged with their cutting edges as shown most clearly in Fig. 2.

By constructing and arranging the cutters as described it will be noticed that to each bar K is secured a pair of cutters, which, it will be seen are adapted to be dragged over the ground, and are adjustably held in contact therewith to bear against same with varied pressures. To this end, upon the rear end of each bar K is held a coiled spring or other yielding member T, with which engages the short end of a pivoted lever arm U the long or handle member of which extends rearward and engages a rack or detent bar V, see Fig. 3. By the aforesaid construction it will readily be seen that as the lever U is elevated, increased pressure downward will be applied to the rotary cutter bars and cutters, it being understood that when it is desired to elevate such bars and cutters from an operative position, the said lever pressure is released from such bars K.

It will be noticed that by arching the side bars A' as before stated provision is made to allow for a vertical movement of the said cutters.

To the front bar A are secured to project laterally at each side bars Y, to which and to the front bar A are secured a series of rake teeth X, which serve to drag the turned down stalks to a straight position whereby they will be in the path of the cutters and such teeth which are in the nature of spring fingers are vertically adjustable, they having vertically extending apertured members X which fit in bearing boxes Z on the front of the bars A and Y and are held by the bolts Z'.

To prevent the operator from falling onto or otherwise engaging the cutters during their rotation, guard bars $D^5$ $D^6$ are placed over the same as clearly shown in the drawings.

From the foregoing description taken in connection with the drawings, it will be noticed especially from Fig. 2, that the caster wheel is adapted to travel in the furrow, while the drive wheels, travel at the sides of the hills or rows and the cutters directly over the rows. Thus as the machine travels forward and the cutters engage the ground they will rotate in the direction indicated by the arrow, and cut the stalks close to the ground, the rakes straightening the stalks in advance.

While I prefer to employ the construction of frame heretofore described, it is manifest that other constructions of frames may be employed to support the cutter devices, as for instance, I may use the construction shown in Fig. 6. In this case to the main frame is secured depending arms $A^5$ to which are secured clip boxes $a^5$ held rigid by means of brace bars B' which are secured to such clip boxes having ears $a^6$ to which is pivotally connected the front end of the cutter bar $K^5$, the rear end of which is connected by the chain $L^5$ with the shaft $m^5$ as shown.

Having thus described my invention, what I claim, and desire to secure by Letters Patent, is—

1. A stalk cutting machine comprising a main frame having a supporting axle at its rear end and a central wheel support at its front end, arms pivoted at their front end to the side arms of the main frame, said pivoted arms having bearing boxes projected laterally to each side of the side arms of the main frame rotary shafts journaled in such boxes, having cutter disks on their ends and flexible connections between the rear ends of the cutter bearing arms and the main frame, all substantially as shown and for the purposes described.

2. A stalk cutting machine comprising a main frame, having a supporting axle at its rear end and a central wheel support at its front end, cutter carrying arms pivoted at their front end to the side arms of the main frame, rotary shafts mounted to project transversely to each side of the said arms, cutter disks secured on the ends thereof, laterally projecting portions connected to the front of the main frame, stalk straightening fingers adjustably held in such extended portions and the front bar of the frame and connections between the rear ends of the cutter arms and the main frame all arranged substantially as and for the purpose described.

3. In a stalk cutting machine, the combination with the main frame including the axle, the rear supporting wheels and the front guide wheel F arranged substantially as shown, of the cutter supporting bars K, pivoted at their front ends to the side bars of the main frame, said bars K having boxes O extended laterally to each side of the side bars of the main frame, shafts journaled in such boxes, with their opposite ends projected, rotary cutters mounted on such ends, a winding shaft on the main frame, flexible connections between such shaft and the rear ends of the bars K lever for lifting such ends of bars K all arranged substantially as shown and for the purposes described.

4. In a stalk cutting machine, the combination with the main frame including the axle supporting wheels and the front guide wheels constructed substantially as shown, the cutter bars pivotally connected at their front ends to the side bars of the main frame, of plates secured to the rear ends of the said bars, said plates extended laterally and formed with half bearings on the ends of their under faces, shafts held in such bearings and projected at their ends, rotary cutters mounted on such ends, and means for elevating the rear ends of such bars mounted on the main frame all arranged substantially as shown and described.

5. The combination with the main frame A, having its side arms arched upward, the axle, the drive wheels and the front support, of the pivoted arms K, lifting devices adapted to be operated from the driver's seat connected with the rear end of said bars K, such bars having bearing boxes projected laterally under the arched side arms of the main frame, shafts held to rotate in such boxes, with their ends projected, and radial cutter arms secured to such projected ends to rotate therewith all arranged substantially in the manner shown and described.

HENRY NEHRMEYER.

Witnesses:
FRED G. DIETERICH,
SOLON C. KEMON.